Aug. 28, 1962  B. F. WOJCIK  3,050,859
DEPTH GAUGE
Filed March 3, 1959  2 Sheets-Sheet 1
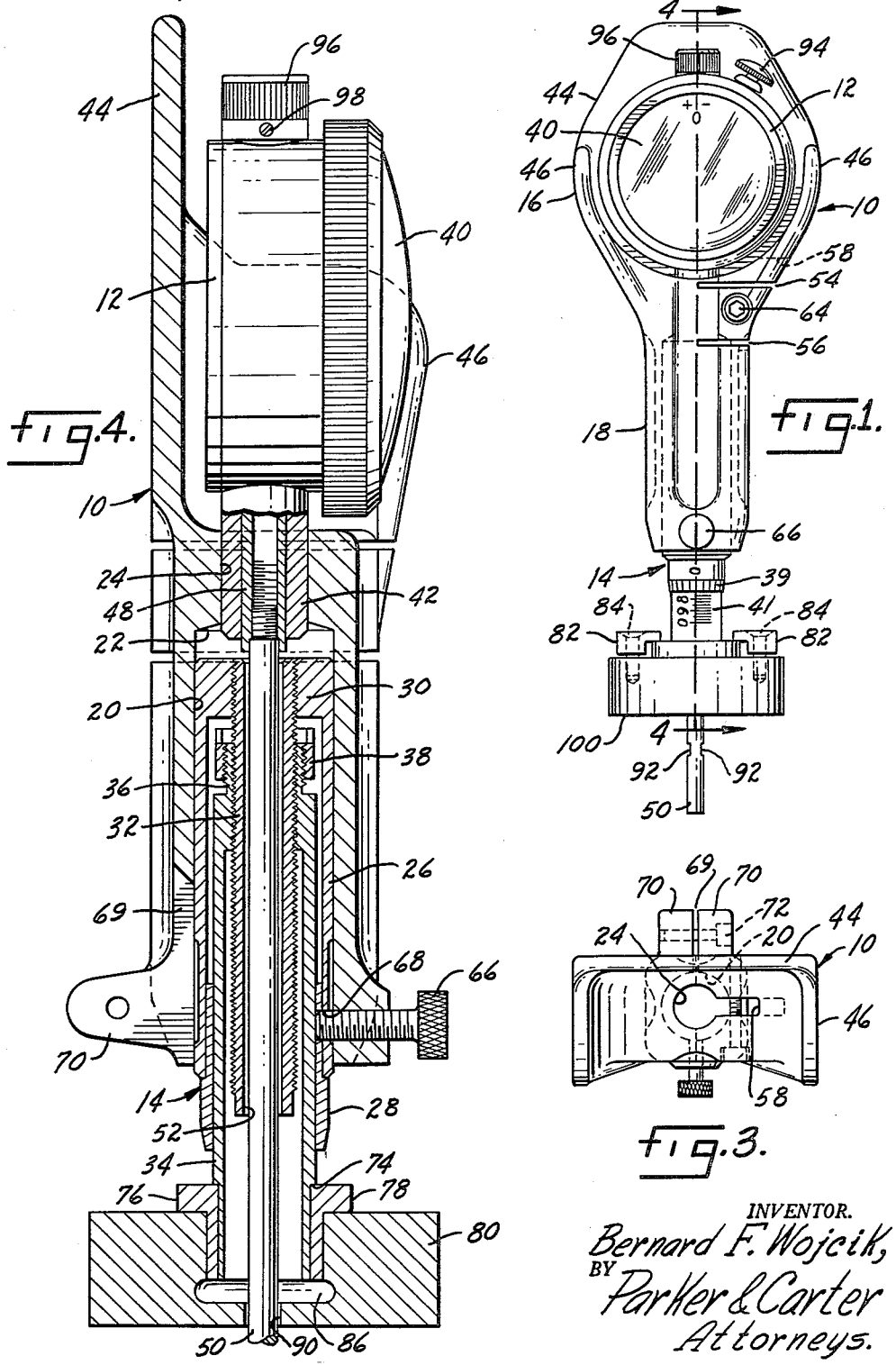
INVENTOR.
Bernard F. Wojcik,
BY Parker & Carter
Attorneys.

Aug. 28, 1962 B. F. WOJCIK 3,050,859
DEPTH GAUGE

Filed March 3, 1959 2 Sheets-Sheet 2

INVENTOR.
Bernard F. Wojcik,
BY Parker & Carter
Attorneys.

United States Patent Office 3,050,859
Patented Aug. 28, 1962

3,050,859
DEPTH GAUGE
Bernard F. Wojcik, Beloit, Wis., assignor to Limit Gages, Inc., Chicago, Ill., a corporation of Illinois
Filed Mar. 3, 1959, Ser. No. 796,885
3 Claims. (Cl. 33—172)

This invention is in the field of gauges and is concerned with what I shall refer to as a depth gauge. Such a device is for measuring the depth of a hole, depression, indentation or the like.

A primary object of the invention is a depth gauge or comparator which is a combination micrometer and dial indicator.

Another object is a depth gauge of the above type for fine adjustment of the dial indicator.

Another object is a combination micrometer and dial indicator with a housing that cradles the dial indicator.

Another object is a depth gauge of the above type with an interchangeable base.

Another object is a combination micrometer and dial indicator with a locking arrangement that does not offset or misalign the graduations or indicia on the micrometer.

Another object is a depth gauge of the above type which is greatly simplified and is accordingly inexpensive.

Another object is a combination micrometer and dial indicator with the dial indicator having interchangeable rods that extend down through the micrometer.

Another object is a depth gauge of the above type with a floating mounting for the dial indicator.

Another object is a housing for a depth gauge of the above type constructed so that any standard dial indicator may be used.

Another object is a depth gauge of the above type with a rod on the dial indicator that can be quickly and easily changed.

Another object is a comparator of the above type that requires much less time to zero or set initially.

Figure 5:
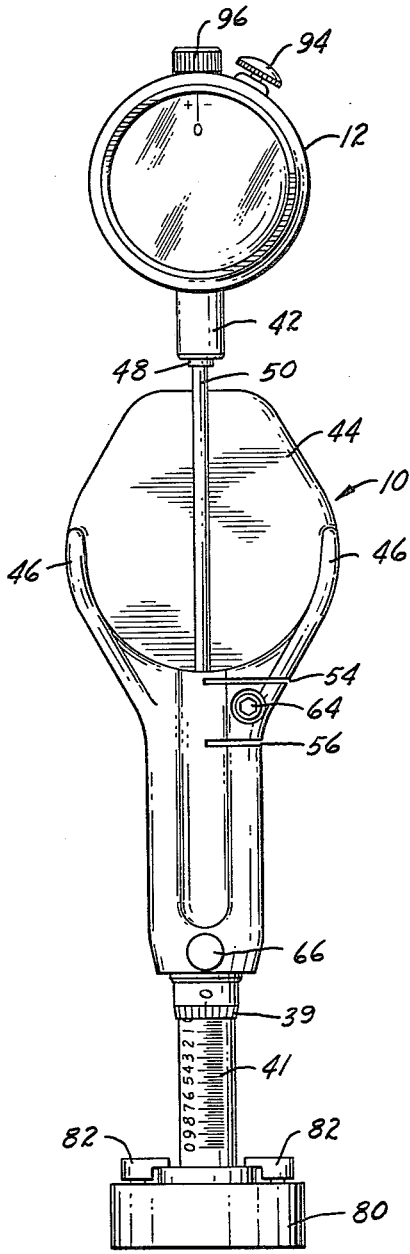
Figure 2:
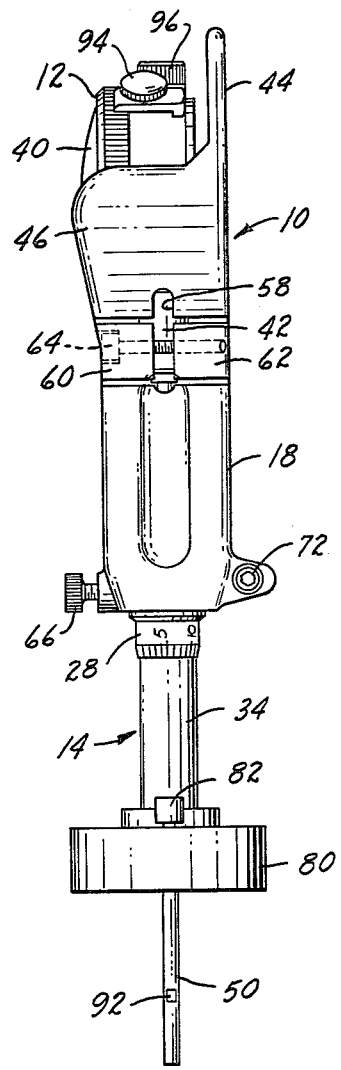

Other objects will appear from time to time in the ensuing specification and drawings in which:

FIGURE 1 is a front view of my gauge;
FIGURE 2 is a side view of FIGURE 1;
FIGURE 3 is a top view of the unit in FIGURE 1 with the dial indicator removed;
FIGURE 4 is a section along line 4—4 of FIGURE 1, on an enlarged scale; and
FIGURE 5 is a view like FIGURE 1 with the dial indicator partially withdrawn.

In FIGURE 1 I have shown my depth gauge as including the housing 10 that supports or encloses two main units, a micrometer 14 and a dial indicator 12. The housing is shown with an upper portion 16 and a lower portion or body 18.

Considering first the lower portion or body 18, the housing may have an axial bore or enclosure 20 which is circular in cross section and accepts or houses the micrometer 14. Toward the upper portion the housing may reduce, as by a shoulder 22, to a somewhat smaller bore 24.

In detail, the micrometer itself includes the thimble 26 which is hollow on the inside with a tip or insert 28 pressed or sweated into its lower end. It will be noted that this tip or insert forms a downward continuation of the thimble and extends outside of the body 18 of the housing. The upper portion of the thimble closes, at 30, and has a screw threaded bore that receives a tube 32 which has a threaded exterior. In short, the tube 32 is threaded into the upper portion of the thimble.

A barrel 34 has a somewhat closed or reduced upper end 36 which may be longitudinally split, not shown, and provided with a closing nut 38 with the interior of the upper end threaded and meshing with the threaded exterior of tube 32. The object of the splits and closing nut 28 is that when wear occurs in the threads of the barrel, the nut may be turned to close the split upper end, thereby compensating for wear. But this feature is well known.

The exterior of the insert 28 on the thimble has the usual circumferentially arranged graduations 39 while the barrel has longitudinally arranged graduations 41 to indicate the degree or extent of telescoping between the barrel and thimble.

The dial indicator 12 has a circular housing with a face 40 that opens forwardly, as shown in FIGURE 1. A stem 42 from the dial indicator fits in the bore or passage 24 in the upper portion of the housing with a rather good fit. It will be noted that the upper portion of the housing is formed into a back plate 44, as shown in FIGURE 1, which more or less conforms to the outline of the dial indicator but completely surrounds and backs it up, as shown in FIGURE 1. The sides 46 of the upper portion of the housing rise arcuately on each side but out of contact with the dial indicator, while the front of the housing is totally open, as shown in FIGURE 1. It shall also be noticed that the top is open. Thus the dial indicator, while completely out of contact with the upper portion of the housing, is nevertheless cradled in it and is fully protected by it. The only point of contact between the dial indicator and the cradlelike protective upper portion of the housing is the mounting of the dial indicator's stem 42 in the bore 24.

A feeler rod 48 projects through the stem 42 of the dial indicator and has an internally threaded socket in its lower end. An elongated rod 50 having a screw threaded upper end screws into this socket and extends down through the housing, through the micrometer, and out of the lower end. For this purpose the tube 32 is hollow and has a central passage 52 through which the rod 50 projects.

As shown in the drawings the side of the housing is laterally split with an upper slit or slot 54 and a lower one 56. The area in between is further divided by a longitudinal slot on the side, as at 58, so that the two in between areas 60 and 62 will be somewhat flexible. It will be noted that these slits or slots intersect the central bore of the housing, the upper slot 54 coming into the reduced bore 24 and the lower one 56 into the main or enlarged bore or passage 20. A suitable screw 64 or the like is disposed in suitably threaded holes between the two portions 60 and 62 to draw them together and the head of the screw may be exposed on the front or back of the housing, as shown in FIGURE 1, so that it may be turned by a suitable wrench.

It will thus be seen that the slots 54 and 56 extend generally over to the center axis of the housing, as shown in FIGURE 1, and when the screw 64, or whatever actuating means is used, is turned, the two leaves or flexible portions 60 and 62 will be drawn toward each other thereby clamping the stem 42 of the dial indicator between them. With the screw 64 backed off, the dimensioning is such that the dial indicator may be withdrawn out through the top of the housing, as shown in FIGURE 5, or it may be merely adjusted up or down. But with this stem 42 of the dial indicator inserted and properly positioned, as explained in the operation of the device hereinbelow, the screw 64 may be turned by the use of a wrench to clamp the dial indicator in place.

The particular clamping means shown at 60, 62 and 64 is not critical and I prefer an arrangement which will hold the dial indicator firmly in the housing without applying excessive pressure to the stem 42. In other words, the dial indicator should be firmly held but the feeler rod 48 and extension 50 should be absolutely free and should not bind up or drag. The point is that any siutable clamping arrangement which will not bind up the movements of the dial indicator may be used and the one shown is satisfactory.

A locking screw 66 or the like fits in a threaded bore in the lower end of the housing or body portion. This set screw extends through an opening or hole in the thimble and insert, as shown at 68, and engages the outside of the barrel 34. It should be noted that the screw is aligned with the graduations on the insert and barrel. For example, note in FIGURE 1 that the zero point of the graduations circumferentially around the insert 28 is directly aligned with the screw. The micrometer is operated in a conventional manner. The longitudinal graduations 41 on the barrel are lined up with the zero point on the thimble insert 28. When the desired reading is thus lined up with the zero, the screw is rotated and the barrel will be firmly but releasably held at this setting. It is important that the screw be aligned with the zero point, rather than with the side, for example, since otherwise the pressure of the set screw would cause misalignment. But by having the set screw directly aligned with the zero, the barrel will only be pushed against the back of the thimble and no misalignment will occur. It should be understood that the screw could be 180° around on the other side of the housing, rather than on top, as shown in the drawings. And no misalignment would occur. I prefer that the screw be made of nylon so that the barrel will not be marred or scratched, but this is optional.

The back of the body 18 is longitudinally split, as at 69, and projections 70 on each side thereof are provided with aligned bores which are internally threaded and have a suitable screw 72 or the like having an exposed head which may be turned by a suitable wrench. In fact, I prefer that the screws 64 and 72 both be turned by the same wrench, to reduce the number of auxiliary parts. The result of tightening screw 72 is to pull the two lobes or projections 70 together thereby contracting the lower end of the housing and holding the thimble firmly in place. If the micrometer is to be removed, the set screw 72 may be backed off and the thimble and barrel may be removed out through the lower end of the housing.

The lower end of the barrel 34 has a shoulder 74 below which is a reduced portion. A collar 76 or the like may be sweated or otherwise held on this reduced portion. The collar is provided with an outstanding flange 78 against which a base or block 80 seats. As shown, this base may be circular and of a predetermined thickness. The base is releasably held on the collar by two or more clamps or dogs 82, each of which is held on the upper surface of the base by a suitable screw 84 or the like. The bore through the base is enlarged at 86 to avoid close tolerances and the rod 50 projects through a suitable opening 90.

I provide slots or notches 92 on each side of the lower end of the rod so that by the use of a suitable wrench, the rod may be turned to unscrew its upper end from the threaded socket in the feeler 48 of the dial indicator. The reason for this is that I wish, on occasion, to change rods so that a different length rod may be used, and I want to do this while the dial indicator is mounted and firmly clamped on the housing.

The dial indicator is shown with a clamp 94 of the usual type to hold the face in any given position which, as is known, is used in zeroing the setting of the dial indicator in any given operation. The usual rack, not shown, found in a dial indicator of this type also projects up into a cap 96, and to limit the pointer or hand of the dial indicator to a predetermined number of revolutions, for example one and one-half, I may dispose stops in the form of screws 98 or the like in the cap which limit the movement of the rack, not shown.

The arrangement shown for limiting the movement of the dial indicator is merely an example. The cap 96 and screw 98 should be arranged otherwise. No particular effort is made toward the specific arrangement shown. Any suitable means which will limit the movement of the dial indicator to a predetermined travel will be adequate.

The use, operation and function of my invention are as follows:

I superimpose a dial indicator on a micrometer. The dial indicator is provided with an extended rod which extends through the micrometer and out the lower end of the base. The depth of a given depression, hole, or what have you, is measured by sticking the projected end of the rod down in the hole to be measured and resting the gauging surface 100 of the base, this being the lower surface, on top of the hole or flush against the outside thereof. The micrometer has previously been set and if the reading on the dial indicator comes to a predetermined value or within certain tolerances, the hole has the proper depth.

The unit should be initially zeroed. This is done by turning the base and barrel until the barrel is fully extended and the graduations on the thimble and barrel are all the way out to the end and the zero is lined up. Then the clamping means that holds the dial indicator in the housing, this being the screw 64, is loosened and the entire unit is placed on a flat surface. This puts the lower gauging surface 100 of the base or block and the lower end of the rod 50 in the same plane. The dial indicator, as a unit, will move up or down in the bore 24 of the housing. With the gauging surface 100 on a flat surface and the dial indicator totally free so that it may properly position itself, the screw 64 should again be tightened. Then the clamp 94 may be released to free the face of the dial indicator and the face may be turned until the zero on the graduations of the dial indicator face may be brought under the pointer. Then the clamp 94 should be retightened. At this point the entire instrument is zeroed.

Assume that the workpiece, whatever it is, has a hole with a certain desired depth. The barrel is then turned until this depth is shown on the graduations of the thimble and barrel of the micrometer. In effect, this will rotate the barrel and base up into the housing and the rod 50 of the dial indicator will stay in its same position. This causes the rod to extend the predetermined desired distance below the gauging surface 100. Next, the unit is ready for use and the rod may be inserted in the depression to be measured with the gauging surface 100 placed flush against the outside. If the hole is of the proper depth, the pointer on the dial indicator will come to zero. But if the hole is inaccurate, the pointer will be off.

As shown in my prior Patent No. 2,663,946, I adjusted the length of the rod 50 to zero the entire instrument. But this was difficult.

The present improvement provides for the entire dial indicator to be adjusted during the zeroing process, and when zeroed the floating mounting may be clamped so that the dial indicator will be held rigidly in place. In effect, the dial indicator is adjustable on the housing, but once clamped, is rigidly held. Since the thimble is also clamped by the set screw 66, the dial indicator and thimble are thereafter fixed relative to each other. When the barrel and base have been rotated to the proper setting, the desired dimension or hole depth will be reflected in the length of rod exposed below the gauging surface 100.

By this floating or adjustable mounting of the dial indicator in the housing, the zeroing process is greatly simplified and accuracy is increased. Additionally, the time required to zero the device is materially reduced.

The set screw 66 holds the micrometer on any given setting. By aligning this holding means with the graduations on the barrel, I prevent side shift and misalignment when the unit is tightened.

The housing has the advantage that it allows the micrometer to be removed for adjustment and repair but, at the same time, holds it rigidly and accurately in place during use. The upper portion of the housing with the cradle mounting that partially surrounds the dial indicator has the advantage that it fully protects the dial indicator against rough handling.

The removable mounting of the base is of particular advantage since it quite often occurs that the operator wants to use a thicker or thinner base. In the arrangement shown, the base may be quickly released, removed, and replaced with another having a different thickness. I have stated that the collar 76 is sweated on the barrel 34. But it might be pressed, screwed, or otherwise suitably held. Sweating, however, is preferred at the present.

A unit of this type may have several rods 50 of different lengths. For example, a standard rod may be supplied which will be exactly flush with the lower end or gauging surface 100 of the base when the micrometer is screwed all the way out to zero. The next rod may be precisely and exactly one inch longer. In this case, zeroing would have to be done with a one inch master block. The next rod might be exactly two inches longer and two one inch master blocks could be used. But the point is that by making the rod quickly and easily removable and interchangeable with rods of different lengths, I greatly extend the range of use of the unit.

While I have shown and described the preferred form and suggested several variations of my invention, it should be understood that suitable additional modifications, changes, substitutions, and alterations may be made without departing from the invention's fundamental theme. I, therefore, wish that the invention be unrestricted except as by the appended claims.

I claim:

1. In a depth gauge for comparing the actual dimension of a depression relative to a predetermined dimension desired therefor, a telescoped micrometer thimble and barrel adapted to be rotated relative to each other with indicia thereon for indicating the amount of their telescoping, a base fixed to the barrel and having a gauging surface, the barrel and base having aligned bores, a housing fixed to and surrounding at least a portion of the thimble and having an upper portion extending beyond the end of the thimble and barrel remote from the base, a bore in the upper portion aligned with the bores in the barrel and base, a dial indicator mounted in the upper portion of the housing with a rod extending through the aligned bores, means for adjustably mounting the dial indicator on the housing so that the dial indicator and its rod may be axially adjusted, as a unit, in the aligned bores, a lateral threaded bore through the housing and thimble aligned so that when the indicia on the thimble and barrel is zeroed, the lateral bore will be aligned with the indicia on the barrel, and a manually operable set screw in the lateral bore for preventing rotation of the thimble relative to the housing and for releasably holding the barrel in any given position relative to the thimble.

2. In a comparator, a telescoped micrometer thimble and barrel screwed together and adapted to be rotated relative to each other with indicia thereon for indicating the amount of their telescoping, a base fixed to the barrel and having a lower gauging surface, the barrel and base having aligned bores, a housing fixed to and surrounding at least a portion of the thimble, and means for removably fixing the housing to the thimble and for releasably holding the barrel and thimble fixed relative to each other, including a locking screw threaded into the housing, and a passage in the thimble allowing the screw to engage the barrel to fix it and, at the same time, to fix the thimble.

3. The structure of claim 2 further characterized in that the locking screw is longitudinally aligned with the zero of the indicia on the thimble.

References Cited in the file of this patent

UNITED STATES PATENTS

| 490,860 | Snoeck | Jan. 21, 1893 |
| 2,566,321 | Eisele | Sept. 4, 1951 |
| 2,654,157 | Eisele | Oct. 6, 1953 |
| 2,662,296 | Stedman | Dec. 15, 1953 |
| 2,663,946 | Wojcik | Dec. 29, 1953 |
| 2,693,036 | Garrett | Nov. 2, 1954 |
| 2,811,780 | Martin | Nov. 5, 1957 |

FOREIGN PATENTS

| 433,368 | Italy | Apr. 7, 1948 |